United States Patent
Stewart (10) Patent No.: US 9,019,081 B2
(45) Date of Patent: Apr. 28, 2015

(54) TAG DETACHER WITH HAPTIC FEEDBACK

(71) Applicant: Sensormatic Electronics, LLC, Boca Raton, FL (US)

(72) Inventor: Justin Stewart, Deerfield Beach, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 142 days.

(21) Appl. No.: 13/770,543

(22) Filed: Feb. 19, 2013

(65) Prior Publication Data
US 2014/0232530 A1    Aug. 21, 2014

(51) Int. Cl.
| | |
|---|---|
| H04Q 5/22 | (2006.01) |
| G06K 19/07 | (2006.01) |
| E05B 73/00 | (2006.01) |
| E05B 39/00 | (2006.01) |
| E05B 47/00 | (2006.01) |
| E05B 17/00 | (2006.01) |

(52) U.S. Cl.
CPC ........ G06K 19/0723 (2013.01); E05B 73/0064 (2013.01); E05B 39/007 (2013.01); E05B 47/0012 (2013.01); E05B 73/0052 (2013.01); E05B 17/0083 (2013.01)

(58) Field of Classification Search
USPC ............... 340/10.5, 572.1–572.9, 568.1, 571, 340/10.1, 568.8, 568.2, 505, 540
See application file for complete search history.

(56) References Cited

U.S. PATENT DOCUMENTS

| | | | |
|---|---|---|---|
| 5,025,246 A | 6/1991 | Schenkel | |
| 5,168,263 A | 12/1992 | Drucker | |
| 5,357,240 A | 10/1994 | Sanford et al. | |
| 5,426,419 A * | 6/1995 | Nguyen et al. | 340/572.9 |
| 5,942,978 A * | 8/1999 | Shafer | 340/572.9 |
| 6,204,765 B1 | 3/2001 | Brady et al. | |
| 7,479,885 B2 | 1/2009 | Greubel | |
| 7,557,705 B2 | 7/2009 | Oas | |
| 8,416,082 B2 * | 4/2013 | Sayegh et al. | 340/572.8 |
| 2010/0097219 A1 * | 4/2010 | Gallo | 340/572.1 |
| 2010/0148945 A1 | 6/2010 | Yun et al. | |
| 2012/0218089 A1 | 8/2012 | Hill | |
| 2012/0235818 A1 * | 9/2012 | Forster | 340/572.1 |

FOREIGN PATENT DOCUMENTS

| | | |
|---|---|---|
| EP | 0213375 A2 | 3/1987 |
| EP | 1445406 A2 | 8/2004 |
| EP | 2 417 925 A1 | 2/2012 |
| WO | 2012094753 A1 | 7/2012 |

* cited by examiner

*Primary Examiner* — Daniel Previl
(74) *Attorney, Agent, or Firm* — Alan M. Weisberg; Christopher & Weisberg, P.A.

(57) ABSTRACT

An electronic article surveillance ("EAS") system tag detacher for unlocking an EAS tag is provided. The EAS tag includes a housing and a locking mechanism disposed within the housing. The EAS system tag detacher includes an EAS tag receiving area configured to receive the EAS tag. The EAS system tag detacher further includes a detaching element configured to unlock the EAS tag; and a haptic feedback element. The haptic feedback element is configured to generate haptic feedback when energized, the haptic feedback element being energized when the EAS tag has been unlocked by the detaching element.

20 Claims, 10 Drawing Sheets

TAG DETACHER WITH HAPTIC FEEDBACK

CROSS-REFERENCE TO RELATED APPLICATION n/a

TECHNICAL FIELD

The present invention relates to methods and systems for detaching an electronic article surveillance ("EAS") security system tag, and in particular, to a method and system for detaching a EAS security system tag and providing haptic feedback relating to the detach operation.

BACKGROUND

EAS security system tags are used by retail stores to prevent theft. An EAS security system tag (referred to herein as an EAS tag) is usually affixed to an item for sale at a retail store and it is removed by a sales associate once a customer pays for the item. The EAS tags typically include a tag body and pin. The pin goes through the merchandise and locks to the tag body. A user, such as a sales associate, can use an EAS system tag detacher to unlock and remove the EAS tag from the merchandise. The EAS system tag detacher unlocks the pin from the tag body. Once the pin and the tag body are no longer locked together, a sales associate removes the pin from the tag body.

Due to many different reasons, an EAS system tag detacher may be unable to successfully detach the pin from the tag body. Nevertheless, the sales associate may assume that the EAS system tag detacher successfully detached the pin from the tag body, and may proceed to pull the pin. This may damage the EAS tag and may cause the sales associate to become frustrated as the sales associate is unable to determine whether or not the EAS system tag detacher unlocked the pin from the tag body.

Some EAS system tag detachers indicate to the user that the pin has been unlocked from the tag body by playing a sound or using blinking Light Emitting Diode ("LED") lights. However, most retail stores play music and are, in general, loud environments, which may cause the sales associate to miss the sound played by the EAS system tag detacher. Further, a sales associate may be interacting with a customer, and may not hear the sound played by the EAS system tag detacher or see a blinking light. Also, the EAS system tag detacher may be positioned in a way that the LED lights are not easily visible by the sales associate. For instance, if the EAS system tag detacher is mounted in a cabinet, the sales associate may not be able to see the EAS system tag detacher LED lights. As such, auditory and visual feedback have limitations.

SUMMARY

The present invention advantageously provides a method and system for providing an EAS system tag detacher with tactile feedback. The EAS system tag detacher vibrates when the EAS system tag detacher has successfully unlocked an EAS tag. The EAS system tag detacher provides sensory feedback to reduce the likelihood of detachment error. Additionally, the haptic feedback provided by the EAS system tag detacher can be used to ensure that the EAS system tag detacher is working properly.

According to one aspect, an EAS system tag detacher for unlocking an EAS tag is provided. The EAS tag includes a housing and a locking mechanism disposed within the housing. The EAS system tag detacher includes an EAS tag receiving area configured to receive the EAS tag. The EAS system tag detacher further includes a detaching element configured to unlock the EAS tag; and a haptic feedback element. The haptic feedback element is configured to generate haptic feedback when energized, the haptic feedback element being energized when the EAS tag has been unlocked by the detaching element.

According to another aspect, a method for detaching an EAS tag using an EAS system tag detacher is provided. The EAS tag includes a housing and a locking mechanism disposed within the housing. The method includes receiving the EAS tag at an EAS tag receiving area of the EAS system tag detacher. The method further includes unlocking, by a detaching element of the EAS system tag detacher, the EAS tag when the EAS tag is received by the EAS tag receiving area; and generating haptic feedback using an energized haptic feedback element, the haptic feedback element being energized when the EAS tag has been unlocked by the detaching element.

According to yet another aspect, an electronic article surveillance ("EAS") system tag detacher for unlocking an EAS tag is provided. The EAS tag includes a housing and a locking mechanism disposed within the housing. The EAS system tag detacher includes an EAS tag receiving area configured to receive the EAS tag. The EAS system tag detacher further includes a detaching element including a hook. The detaching element is configured to unlock the EAS tag by inserting the hook into the housing. The EAS system tag detacher includes a processor configured to determine whether the EAS tag has been unlocked by the detaching element. The EAS system tag detacher also includes a haptic feedback element affixed to a lower part of the EAS tag receiving area. The haptic feedback element is configured to generate haptic feedback when the processor determines that the EAS tag has been unlocked by the detaching element.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Embodiments of the present invention provide a method and system for unlocking an EAS tag. An EAS system tag detacher is used for unlocking an EAS tag. The EAS tag includes a housing and a locking mechanism disposed within the housing. The EAS system tag detacher includes an EAS tag receiving area, a detaching element and a haptic feedback element. The EAS tag receiving area is configured to receive the EAS tag, which has the locking mechanism positioned in the lock position. A user positions the EAS tag in the EAS tag receiving area so that the detaching element can unlock the EAS tag. The haptic feedback element generates haptic feedback when the EAS tag has been unlocked by the detaching element.

Before describing in detail exemplary embodiments that are in accordance with the present invention, it is noted that the embodiments reside primarily in combinations of apparatus components and processing steps related to implementing a method and system for unlocking an EAS tag. Accordingly, the method and system components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 1:
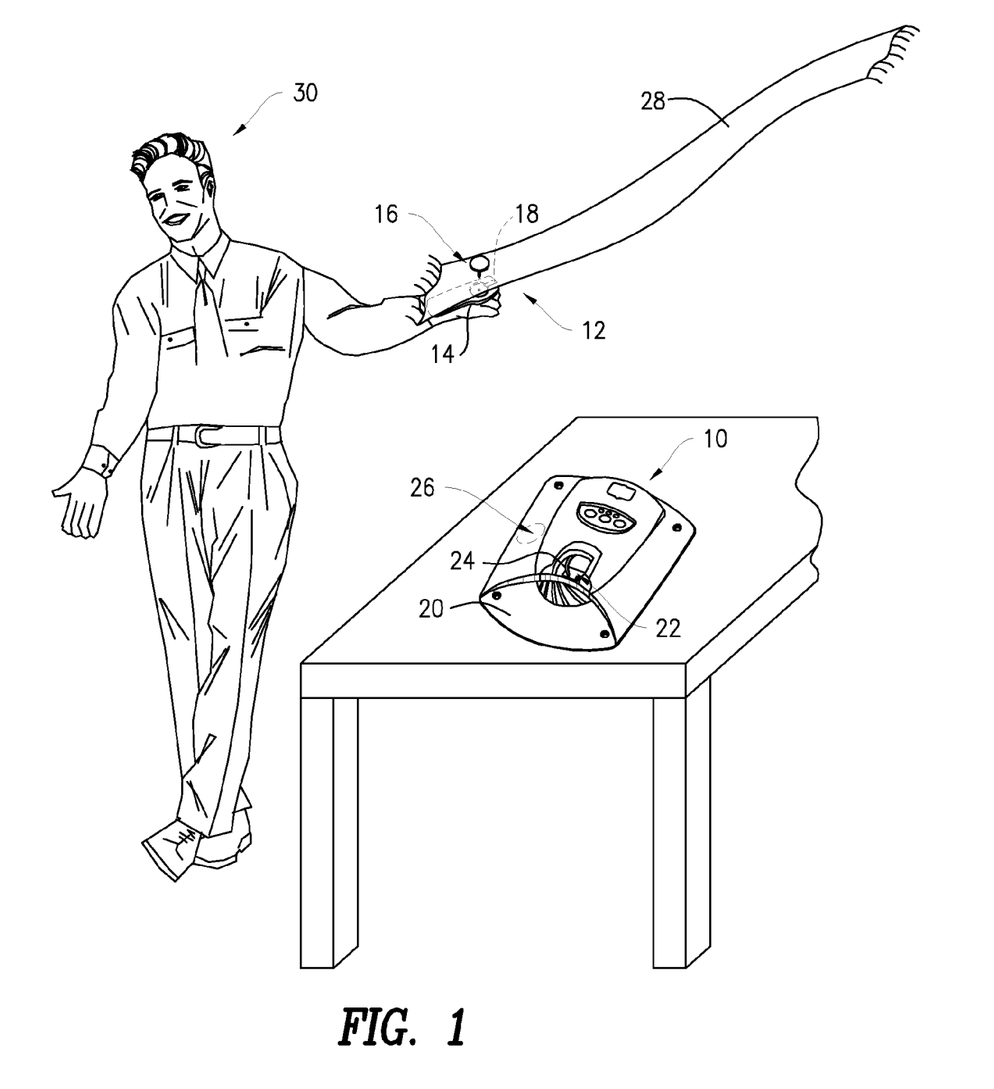
FIG. 1 is a diagram of an exemplary EAS system tag detacher for unlocking an EAS tag in accordance with the principles of the present invention.

Referring now to the drawing figures in which reference designators refer to like elements, there is shown in FIG. 1 a diagram showing an exemplary EAS system tag detacher 10 constructed in accordance with the principles of the present invention. EAS system tag detacher 10 is configured to receive EAS tag 12. EAS tag 12 may include housing 14, pin 16 and locking mechanism 18 (shown in FIG. 2). EAS tag 12 may be any security system tag, such as an acousto-magnetic ("AM") tag, a radio frequency identification ("RFID") tag, a combination of RFID/AM tag, etc.

EAS system tag detacher 10 may be configured to unlock EAS tag 12, by for example, unlocking locking mechanism 18, which detaches pin 16 from housing 14. EAS system tag detacher 10 may include detacher housing 20 and EAS tag receiving area 22 configured to receive EAS tag 12. EAS system tag detacher 10 also includes detacher element 24 configured to unlock EAS tag 12, and haptic feedback element 26 configured to provide haptic feedback in response to detacher element 24 unlocking EAS tag 12.

In an exemplary embodiment, EAS tag 12 may be removably attached to item 28, which may be, for example, a scarf. User 30 may want to remove EAS tag 12 from item 28. User 30 uses EAS system tag detacher 10 to remove EAS tag 12 from item 28. User 30 holds EAS tag 12 with his/her hands and positions tag 14 in EAS tag receiving area 22. Detacher element 24 unlocks EAS tag 12 while user 30 holds EAS tag 12 in EAS tag receiving area 22. In order to indicate to user 30 that EAS tag 12 has been unlocked and is ready to be removed from item 28, haptic feedback element 26 generates haptic feedback. The haptic feedback is felt by f user 28, who is holding EAS tag 12 against EAS tag receiving area 22.

Haptic feedback may include a vibration that causes EAS tag 12 and/or any part of EAS system tag detacher 10, such as EAS tag receiving area 22 and/or detacher housing 20, to vibrate. Since the hand of user 30 is either holding EAS tag 12 and/or is in contact with EAS system tag detacher 10, the hand of user 30 feels the vibration indicating that EAS tag 12 has been unlocked and can be removed from item 28. User 30 senses the haptic feedback originating from haptic feedback element 26 and proceeds to remove EAS tag 12 from item 28.

Figure 2:
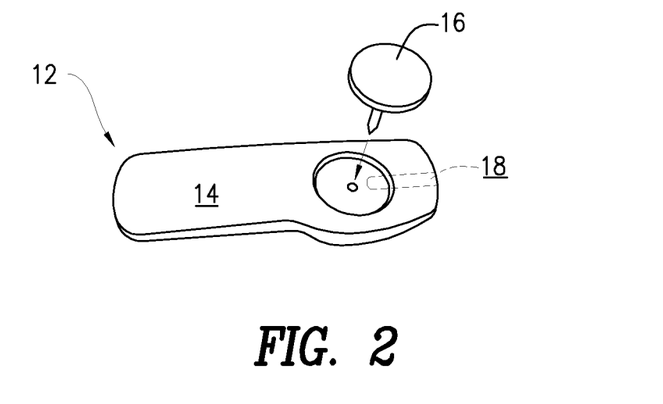
FIG. 2 is a block diagram of an exemplary EAS tag constructed in accordance with the principles of the present invention.

An exemplary EAS tag 12 is described with reference to FIG. 2. EAS tag 12 includes housing 14 and pin 16 removably attached to housing 14 via locking mechanism 18. As discussed above, EAS tag 12 may be a security tag that includes an EAS element which generates a detectable signal when introduced to an interrogation signal. The EAS element may be a magnetic element, acousto-magnetic element, radio frequency identification element, combination of these elements, or some other type of element capable of generating a detectable signal when introduced to an interrogation signal.

EAS tag 12 may be a hard tag made of a hard or rigid material such as injection molded Acrylonitrate-Butadience-Styrene (ABS) plastic or polycarbonate constructed using various materials such as metal and/or plastic. While security EAS tag 12 is illustrated having an elongated shape, other tag shapes may be used based on design need. For example, other EAS tag 12 shapes may be implemented based at least in part on a shape of EAS tag receiving area 22.

Pin 16 is removably insertable into EAS tag 12. The head of pin 16 may be formed using plastic and/or steel, among other materials. EAS tag 12 may be in a lock position or an unlock position. When EAS tag 12 is in a locked position, pin 16 is removably engaged to housing 14, even in the presence of external mechanical and physical forces. EAS tag 12 may be attached to any item, such as item 28, by piercing the item with pin 16 and detachably securing pin 16 to housing 14. In order to securely attach EAS tag 12 to item 28, a user 30 puts EAS tag 12 in a lock position. To remove EAS tag 12 from item 28, EAS tag 12 is positioned in an unlocked position using EAS system tag detacher 10. Detaching element 24 disengages pin 16 from housing 14, i.e., unlocks EAS tag 12, so that EAS tag 12 can be removed from item 28.

In an exemplary embodiment, locking mechanism 18 includes an arcuate channel configured to receive detaching element 24, which may be a correspondingly shaped hook. In order to unlock EAS tag 12, the hook is inserted into the arcuate channel. The hook unlocks locking mechanism 18 by rotating or otherwise moving locking mechanism 18 away from pin 16. By moving locking mechanism 18, pin 16 is detached from housing 14. Detaching mechanism 18, e.g., the hook, moves into the arcuate channel, unlocks EAS tag 12 and moves out of the arcuate channel. In another exemplary embodiment, locking mechanism 18 may be made of magnetic material, such as a magnet. When a magnetic field is applied to locking mechanism 18, locking mechanism 18 moves to release pin 16 from housing 14.

An exemplary EAS system tag detacher 10 is described with reference to FIG. 3. Exemplary EAS system tag detacher 10 includes detaching element 24, haptic feedback element 26 and nest 32 which includes EAS tag receiving area 22 and hand placement area 34. EAS tag 12 is shaped to be received by EAS system tag receiving area 22 of nest 32. Other shapes of nest 32 and EAS tag receiving area 22 may be implemented based on a shape of EAS tag 12. EAS tag receiving area 22 may be shaped to conform to EAS tag 12 so that detaching element 24 may unlock EAS tag 12. EAS tag receiving area 22 may be configured to receive EAS tag 12 in any direction. For instance, EAS tag receiving area 22 may be configured to receive at least a portion of EAS tag 12, such as a part of EAS tag 12 that includes locking mechanism 18 positioned in the lock position, causing EAS tag 12 to be attached to item 28.

In an exemplary embodiment, nest 32 has a lower part 36 (shown in FIG. 4) and an upper part 38. EAS tag receiving area 22 is on upper part 38 of nest 32. Hand placement area 34 may be located next to upper part 38. Hand placement area 34 may be ergonomically shaped to receive a hand of user 30. User 30 holds EAS tag 12 using one or both hands and positions EAS tag 12 in EAS tag receiving area 22 so that EAS tag 12 can be separated from item 28 using detaching element 24.

Haptic feedback element 26 may be a vibrating element configured to generate haptic feedback. The generated vibration is felt by user 30. Haptic feedback element 26 can be affixed to any portion of EAS system tag detacher 10 as long as the vibration can be felt by user 30. For instance, haptic feedback element 26 may be positioned on lower part 36 of nest 32 or under hand placement area 34. The haptic feedback generated by haptic feedback element 26 causes any part of EAS system tag detacher 12, such as hand placement area 34 of nest 32, to vibrate. Mounting haptic feedback element 26 to a structural support on lower part 36 of nest 32, such as under hand placement area 34, may provide sufficient tactile feedback.

In an exemplary embodiment, detacher housing 20 'hides' lower part 36 of nest 32 so that lower part 36 is not visible to user 30 when EAS system tag detacher 10 is operating at a point of sale, such as a store check-out register. Lower part 36 is visible once user 30 removes detacher housing 20. Detacher housing 20 may be made of plastic or any other material that can conduct the vibrations from haptic feedback element 26. Detacher housing 20 may be shaped to be fixed or mounted to a point of sale countertop. Detacher housing 20 may include key pad 58 (shown in FIG. 4). Key pad 58 allows user 30 to lock EAS system tag detacher 10 to prevent unauthorized access.

Detaching element 24 may be a hook configured to enter an arcuate channel in EAS tag 12. When the hook is inserted into the arcuate channel, the EAS tag 12 is unlocked. Detaching element 24 positions EAS tag 12 in an unlock position, such that EAS tag 12 is released from item 28. Alternatively, detaching element 24 may be magnetic and may be configured to disengage locking mechanism 18 in using a magnetic field. As such, detaching element 24 may use a magnetic field to unlock EAS tag 12. The magnetic field generated by detaching element 24 moves locking mechanism 18 from a lock position to an unlock position, causing pin 16 to detach from housing 14. Detaching element 24 may include a magnet or multiple magnets that provide a magnetic field (not shown). The magnetic field causes EAS tag 14 to be in an unlock position and ready to be separated from item 26.

Figure 9:
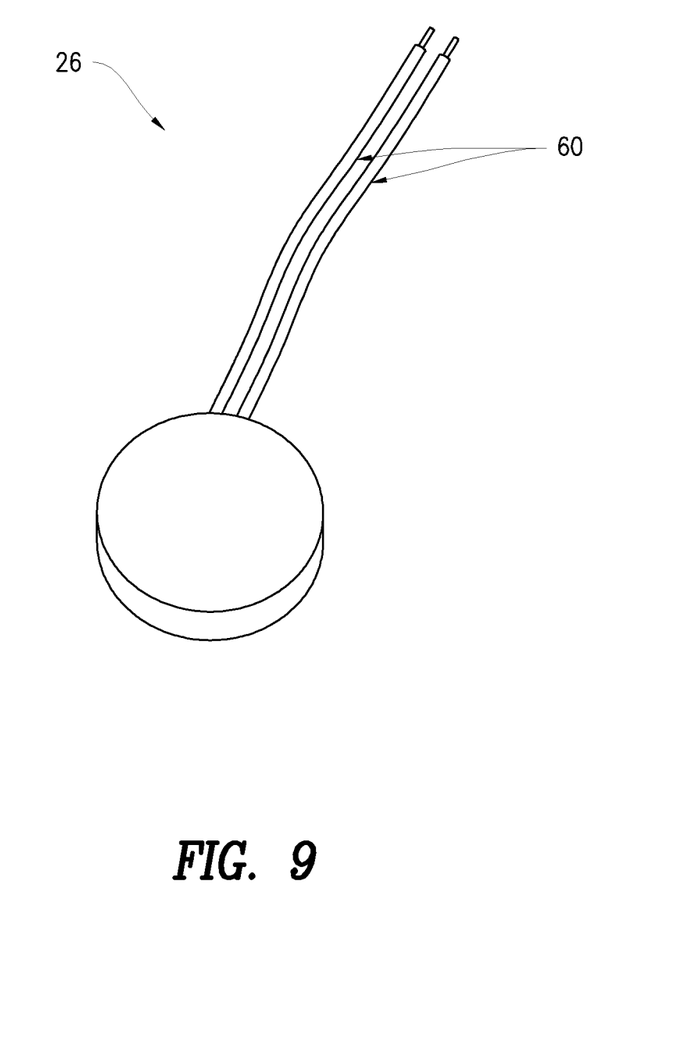
FIG. 9 is a block diagram of an exemplary haptic feedback element constructed in accordance with the principles of the present invention.

In an exemplary embodiment, haptic feedback element 26 includes an eccentric rotating mass ("ERM") vibration motor (shown in FIG. 9). An ERM motor is also referred to as a pager motor. An ERM motor is a DC motor having a non-symmetric mass attached to the shaft, i.e., an offset weight. As the offset mass rotates, the centripetal force of the offset mass is asymmetric, resulting in a net centrifugal force, e.g., vibration. The centrifugal force causes displacement of the motor. Since the motor rotates at a high number of revolutions per minute, the motor is constantly being displaced and moved by the asymmetric forces. The repeated displacement is perceived to user 30 as a vibration. The ERM motor may be driven by a DC signal created by a single MOSFET with a microcontroller.

The ERM motor produces a driven harmonic vibration where an external driving force causes the ERM motor to vibrate. The vibration is harmonic given that the ERM motor vibrates at the frequency of an excitation signal. The excitation input may be the rotation of the mass around the central motor shaft and not the DC voltage applied to the ERM motor. The movement of the mass can be modeled as a sinusoidal wave A sin(wt), where "A" is the amplitude, "t" is the time, and the frequency "w" of the sine wave is the frequency at which the ERM motor vibrates. The DC voltage controls the speed of the motor, which is directly proportional to the vibration. As the voltage increases, the rotation frequency increases proportionally. A constant voltage will drive the ERM motor at a constant speed, and hence constant frequency and vibration amplitude. The ERM motor current is proportional to the torque load seen by the ERM motor.

Different integrated circuits can be used to implement haptic feedback element 26. A complex circuit which allows increased control of the motor is an H-bridge circuit. With an H-bridge circuit, the polarity of the voltage to the motor can be changed quickly, allowing control of the direction of the motor's rotation. Allowing to control the direction of the motor rotation allows 'active braking,' which reduces the time it takes to stop the eccentric mass. Haptic feedback may be generated by reversing the voltage to drive the motor in the opposite direction to its current rotation, i.e., active braking. A single pulse width modulation ("PWM") signal and an H-bridge may be used together.

In another exemplary embodiment, haptic feedback element 26 may include a linear resonant actuator ("LRA") vibration motor. An LRA vibration motor may require a sinusoidal signal that matches the resonant signal of the LRA as input. The LRA vibration motor is more efficient when it operates at its natural frequency, which, for Y-axis vibrators may be around 175 Hz. The vibration amplitude changes when the amplitude of the driving sinusoidal signal changes. A linear vibrator motor, like the LRA, is different to the ERM vibration motor. For instance, an LRA vibration motor may be designed to produce vibrations in either horizontal or vertical directions. LRA vibration motors have a longer life than DC driven ERM vibration motors.

LRA motors use a movable mass, a permanent magnet, a voice coil and a spring to generate vibrations. The voice coil produces a magnetic field with interacts with the permanent magnet, causing it to move. The magnet and mass are suspended on a spring, and the movement of the magnet compresses or stretches the spring. As the magnetic field varies with the applied drive signal, the magnet and the mass are moved up and down as they interact with the spring. An AC drive signal alternates the direction of the current and hence the magnetic field, causing the permanent magnet to oscillate back and forth with the spring. The back and forth movement of the mass generates the vibration, given that the moving mass is attached to the magnet.

In an LRA motor, the AC drive signal has a frequency and an amplitude. The LRA vibration motor is driven with an AC signal, such as a sine wave at the resonant frequency. The amplitude of the driving waveform may be modulated to generate more advance haptic feedback effects. The input signal's amplitude and frequency are independent of each other, which allows the input to have a more complex waveform than with an ERM motor, producing a richer user haptic experience. The higher the amplitude of the AC drive signal, the greater the vibration output for a given frequency.

The LRA vibration motor has a resonant frequency which maximizes the vibration generated. If the input signal frequency is moved too far from the resonant frequency, then the vibration performance decreases significantly. The strength of the vibration produced by the motor is affected by the mass of the eccentric weight, the distance between the eccentric mass and motor shaft, and the speed of rotation. Of note, although an ERM motor and an LRA motor have been described as being used to implement haptic feedback element 26, the invention is not limited to such. Any type of mechanism, electronics or device may be used to implement haptic feedback element 26 and create feedback, such as for example a piezo electric sensor, among others.

EAS system tag detacher 10 may further include processor 40, memory 42, receiver 44, motor 45 and transmitter 46 in communication with each other via communication infrastructure 48. Processor 40 may include a central processing unit ("CPU") for performing the functions described herein with respect to EAS system tag detacher 10. Processor 40 is operatively coupled via a communication infrastructure 48, e.g., a communications bus, cross-bar interconnect, network, etc., to haptic feedback element 26 and detaching element 24.

Transmitter 46 and receiver 44 are used for communicating with security system computer 50 via communication network 52, wirelessly or by wire or optical fiber. Memory 42 may include random access memory ("RAM") and read only memory ("ROM"). Memory 42 may store parameters, such as different frequencies, patterns and vibration strengths. The parameters may be communicated to haptic feedback element 26, so that haptic feedback element 26 may generate haptic feedback according to the parameters. For instance, one parameter may be a frequency parameter of 50 Hz, and if the parameter is sent to haptic feedback element 26, the haptic feedback generated will have a frequency of 50 Hz.

Computer programs (also called computer control logic) may be stored in memory 42. For example, computer programs are stored on memory 42 for execution by processor 40 via RAM, i.e. memory 42. Such computer programs, when executed, enable the method and system to perform the features described herein. In particular, the computer programs, when executed, enable processor 40 to perform functions described herein. Accordingly, such computer programs represent controllers of the corresponding EAS system tag detacher.

In an exemplary embodiment, security system computer 50 may communicate with EAS system tag detacher 10. Security system computer 50 may store parameters, such as different frequencies, patterns and strengths. Security system computer 50 may send to EAS system tag detacher 10 a parameter to use when generating haptic feedback. For example, security system computer 50 may send a message to EAS system tag detacher 10 indicating that haptic feedback element 26 should generate haptic feedback having a frequency of 50 Hz upon EAS system tag detacher 10 determining that EAS tag 12 is unlocked.

Security system computer 50 may send unlock authorizations to EAS system tag detacher 10. Receiver 44 may receive an authorization from security system computer 50 to unlock EAS tag 12, in response to nest 32 receiving EAS tag 12 for unlocking by detaching element 24. Processor 40 may process the authorization and may determine that the authorization is legit. Processor 40 signals detaching element 24 to unlock EAS tag 12 in response to receiver 44 receiving the authorization. Haptic feedback element 26 generates haptic feedback once EAS tag 12 has been unlocked. For instance, haptic feedback may be generated when detaching mechanism 20 successfully enters the arcuate channel of EAS tag 12 and successfully unlocks EAS tag 12 or when detaching mechanism 20 exits the arcuate channel after successfully unlocking EAS tag 12.

In another exemplary embodiment, EAS system tag detacher 10 may include a switch. The switch may detect that EAS tag 12 has been placed on upper nest 38, and may signal motor 45 to activate. Motor 45 activates and rotates one or more gears 56 (shown in FIG. 8) in order to move detaching element 24, e.g., a hook, from a first position into a second position. In the first position, detaching element 24 is not engaged with EAS tag 12, i.e., detaching element 24 is not positioned to unlock EAS tag 12, and in the second position detaching element 24 enters the arcuate channel of EAS tag 12 to unlock EAS tag 12. Haptic feedback element may be generated once the hook is properly in place inside the arcuate channel and/or when the hook rotates back to its initial position. A pure mechanical solution, i.e., no software involved, may provide haptic feedback, such as for example a single 'tap,' instead of a timed vibration.

In another exemplary embodiment, processor 40 may determine which haptic feedback pattern the haptic feedback should have. Haptic feedback element 26 alerts user 30 by generating different alerts, i.e., vibrations for different events. For instance, processor 40 may determine a haptic feedback pattern for the haptic feedback based at least in part on a detaching element event. Processor 40 may instruct haptic feedback element 26 to generate haptic feedback having the determined haptic feedback pattern. Processor 40 may instruct haptic feedback element 26 to generate haptic feedback having a first pattern when detaching element 24 has successfully unlocked EAS tag 12, and a second pattern when detaching element 24 could not unlock EAS tag 12, i.e., detaching element 24 did not unlock EAS tag 12.

Haptic feedback element 26 may provide user 30 with tactile information through varying vibration strengths (e.g., weak or strong), frequencies and patterns. Haptic feedback element 26 can be energized for any amount of time. For example, the haptic feedback element may generate a short vibration that lasts half a second, a long vibration that lasts one second, etc. The haptic feedback generated may inform user 30 of different information, depending on the strength, frequency and/or pattern of the haptic feedback. The haptic feedback may include pulses having a pattern, such as a single tap, a couple of taps separated by a short time, etc.

As such, haptic feedback element 26 relays information to user 30 via a sense of touch of user 30. Haptic feedback provides to user 30 confirmation that an action or event has occurred, such as a detaching element event. For example, the haptic feedback may indicate to user 30 that a task has been completed, where the task is the unlocking of EAS tag 12. Haptic feedback element 24 may produce a simple vibration alert signal having a single high frequency, e.g., a first pattern, and having a short duration when EAS tag 12 has been unlocked. Haptic feedback element 26 may produce vibration that has a low frequency and has a long duration when the EAS tag 12 has not been properly unlock. Haptic feedback element 26 can further be configured to provide lag times between vibrations.

Haptic feedback element 26 may be used in addition to or instead of an audible and/or visual alert. For instance, EAS system tag detacher 10 may include, in addition to haptic feedback element 26, a light that blinks whenever EAS tag 12 is unlocked. EAS system tag detacher 10 may also audibly alert user 30 that EAS tag 12 has been unlocked by, for example, playing a sound. The haptic feedback improves the experience of user 30 and increases the productivity of user 30, as user 30 does not have to manually inspect EAS tag 12 to determine if it has been unlocked and is ready to be pulled from item 28. This is because the vibration alerts user 30 to the detaching element event taking place. Specifically haptic feedback element 26 may improve the response time of user 30, allowing user to process more EAS tags 14 than if EAS system tag detacher 10 did not provide haptic feedback to user 30 via haptic feedback element 26, as user 30 would have to manually inspect each EAS tag 12 to see if it has been properly unlocked.

Figure 3:
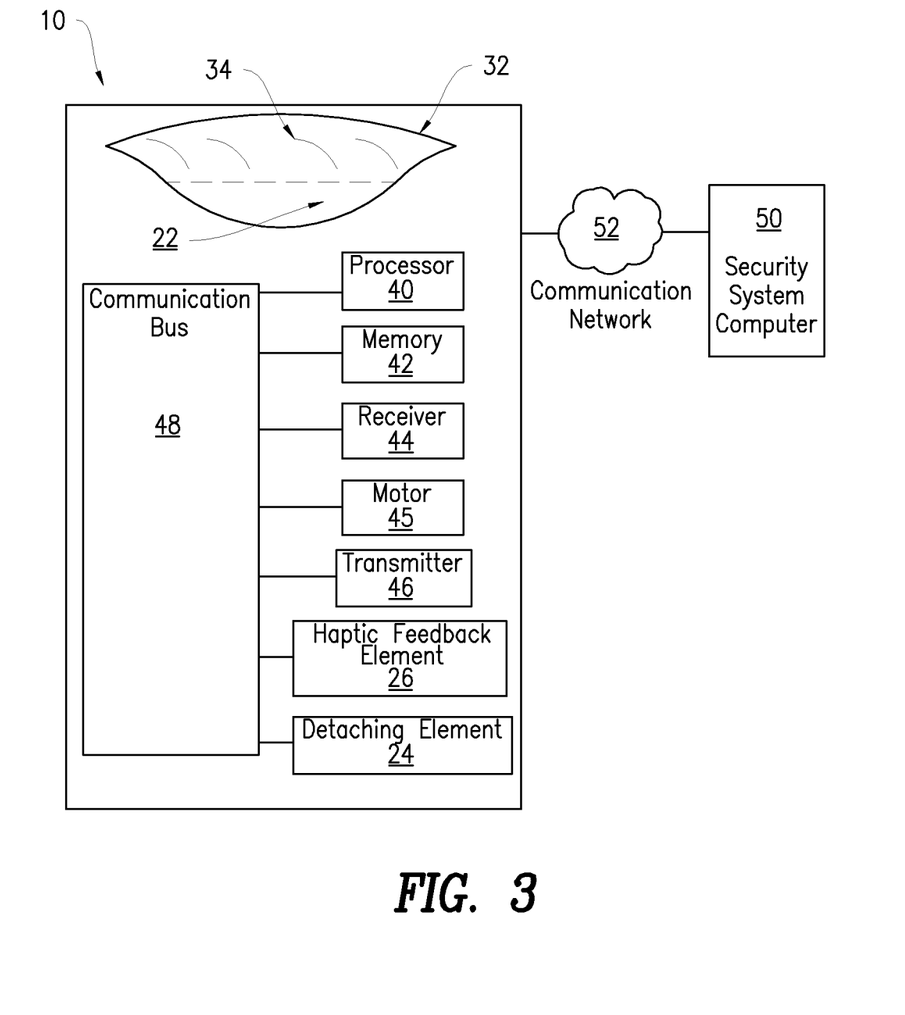
FIG. 3 is a block diagram of an exemplary EAS system tag detacher in communication with a security system computer, the EAS system tag detacher constructed in accordance with the principles of the present invention.
Figure 4:
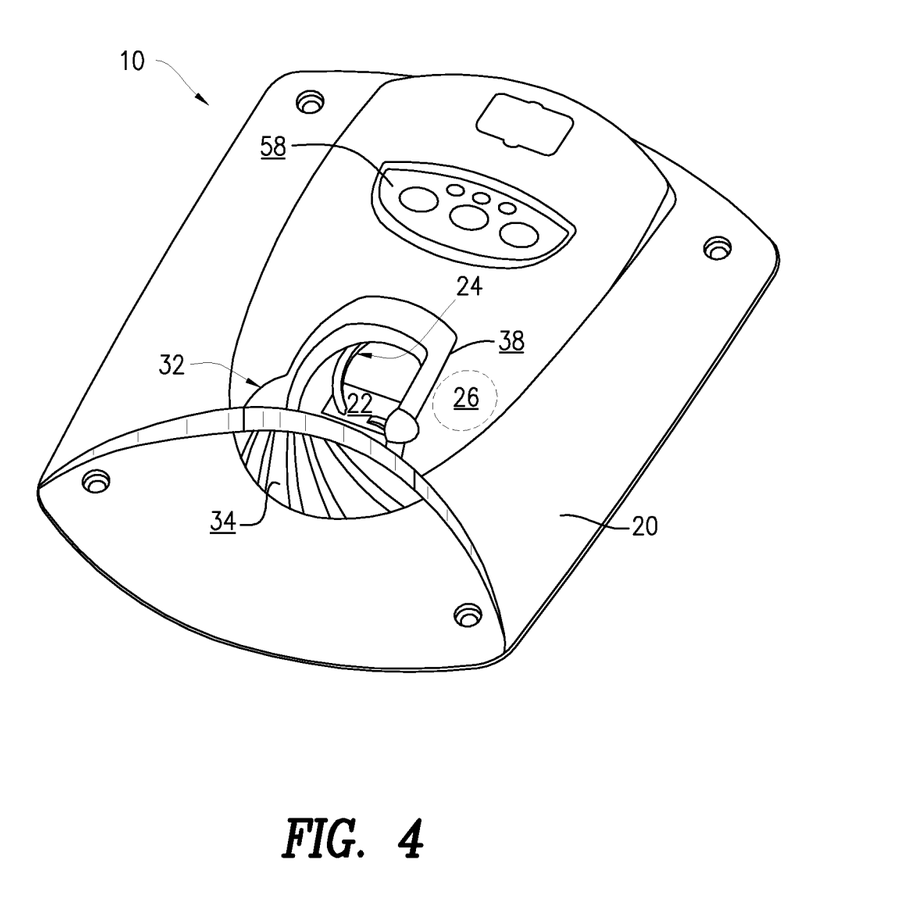
FIG. 4 is another block diagram of the exemplary EAS system tag detacher of FIG. 3 constructed in accordance with the principles of the present invention.
Figure 5:
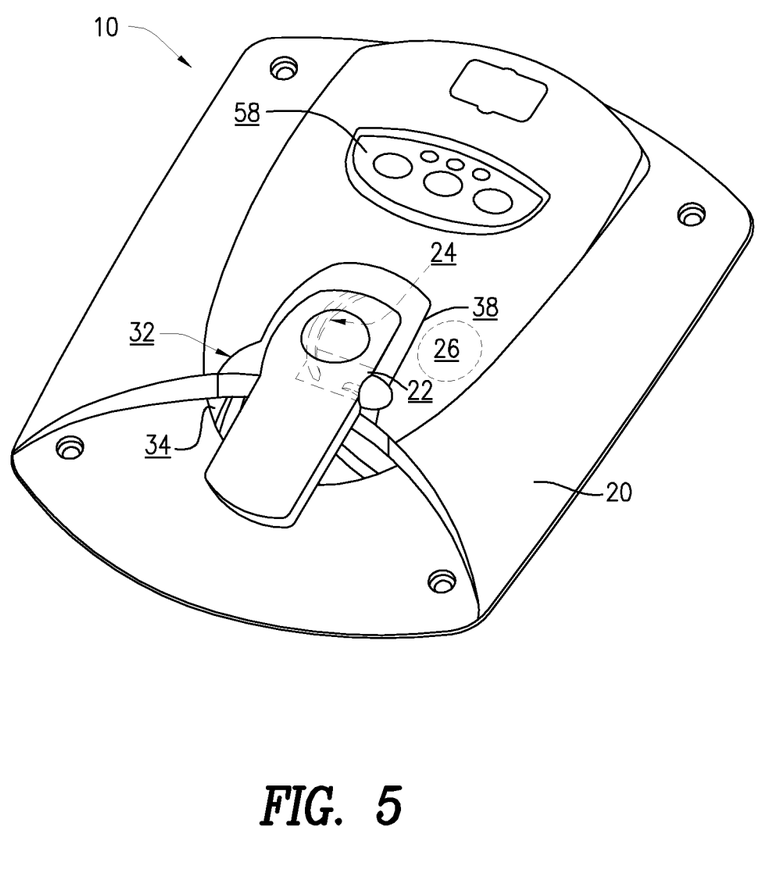
FIG. 5 is a block diagram of the exemplary EAS system tag detacher of FIG. 4 with an EAS tag positioned in the EAS system tag detacher, constructed in accordance with the principles of the present invention.

The exemplary EAS system tag detacher 10 of FIG. 3 is described with reference to FIG. b4. As shown in FIG. 4, nest 32 includes hand placement area 34 and EAS tag receiving area 22. Nest 32 further includes lower part 36 (shown in FIG. 8) and upper part 38. Upper part 38 of nest 32 is positioned above detacher housing 20 to receive EAS tag 12. In this exemplary EAS system tag detacher 10, haptic feedback element 26 is affixed to lower part 36 of nest 32. The exemplary EAS system tag detacher 10 of FIG. 4 is described with reference to FIG. 5, showing an EAS tag 12 positioned in nest 32. EAS tag 12 fits in EAS tag receiving area 22.

An upper view of the exemplary EAS system tag detacher 10 of FIG. 4 with the top portion of detacher housing 20 removed, is described with reference to FIG. 6. EAS system tag detacher 10 includes haptic feedback element 26 located adjacent to lower part 36 of nest 32. Motor 25 is located proximate to detaching element 24 and drives detaching element 24 to unlock EAS tag 12.

To create EAS system tag detacher 10 with haptic feedback element 26, additional software routines are incorporated into EAS system tag detacher 10. Haptic motor 25 provides the tactical response, which may be the most common and most relevant due to cell phone technology, as users are used to receiving haptic feedback from their mobile phones. The haptic feedback may be initiated by a software routine or by simple electrical switches (no software involved). As such, in one exemplary embodiment, haptic feedback may be implemented using purely mechanical parts (such as electrical switches, etc.) and no software.

Figure 6:
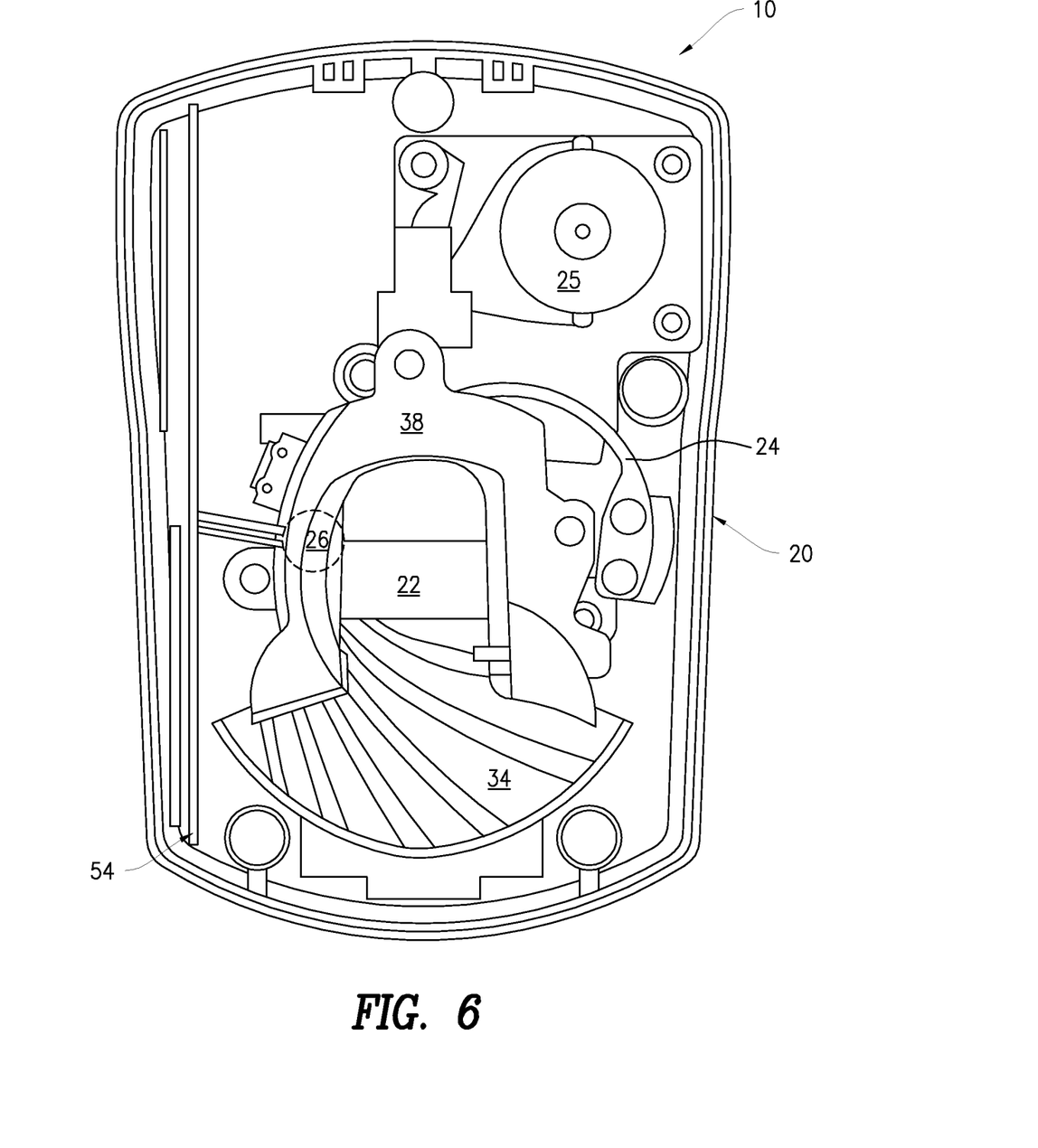
FIG. 6 is a block diagram of an upper view of the exemplary EAS system tag detacher of FIG. 4 with the top portion of the housing removed, constructed in accordance with the principles of the present invention.
Figure 7:
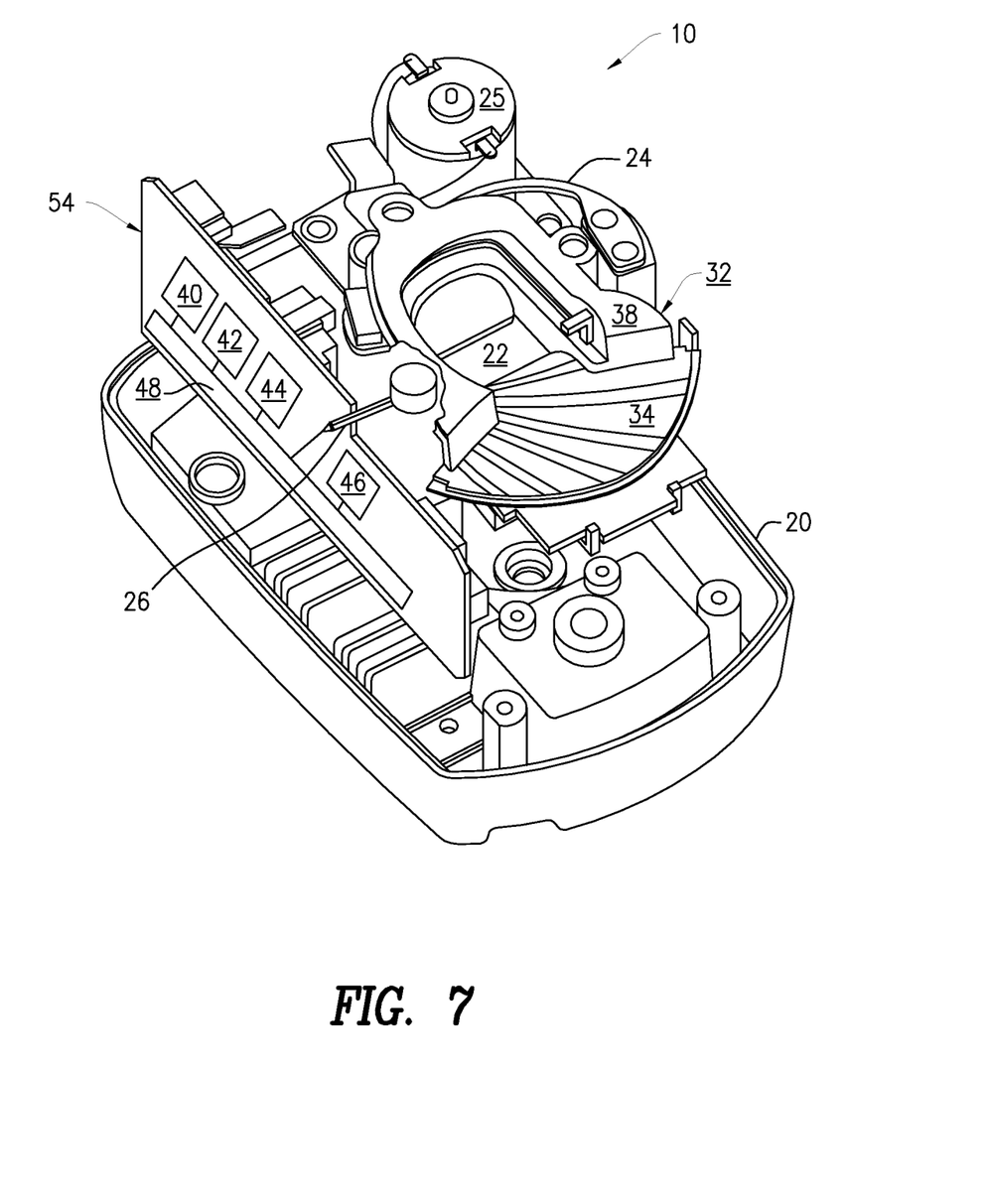
FIG. 7 is a block diagram of an upper perspective view of the exemplary EAS system tag detacher of FIG. 6, constructed in accordance with the principles of the present invention.

An upper perspective view of the EAS system tag detacher 10 of FIG. 6 is described with reference to FIG. 7, which shows haptic feedback element 26 connected to circuit board 54. EAS system tag detacher 10 includes haptic feedback element 26 in communication with circuit board 54 via communication bus 48. Circuit board 54 includes processor 40, memory 42, receiver 44, transmitter 46 and communication bus 48. Of note, even though haptic feedback element 26 is shown as being incorporated in exemplary EAS system tag detacher 10, haptic feedback element 26 may be incorporated in a variety of other EAS system tag detachers that provide feedback to user 30. For example, haptic feedback element 26 may be incorporated into a handheld EAS system tag detacher 10, such as the MK225 Sensormatic® handheld EAS system tag detacher.

Figure 8:
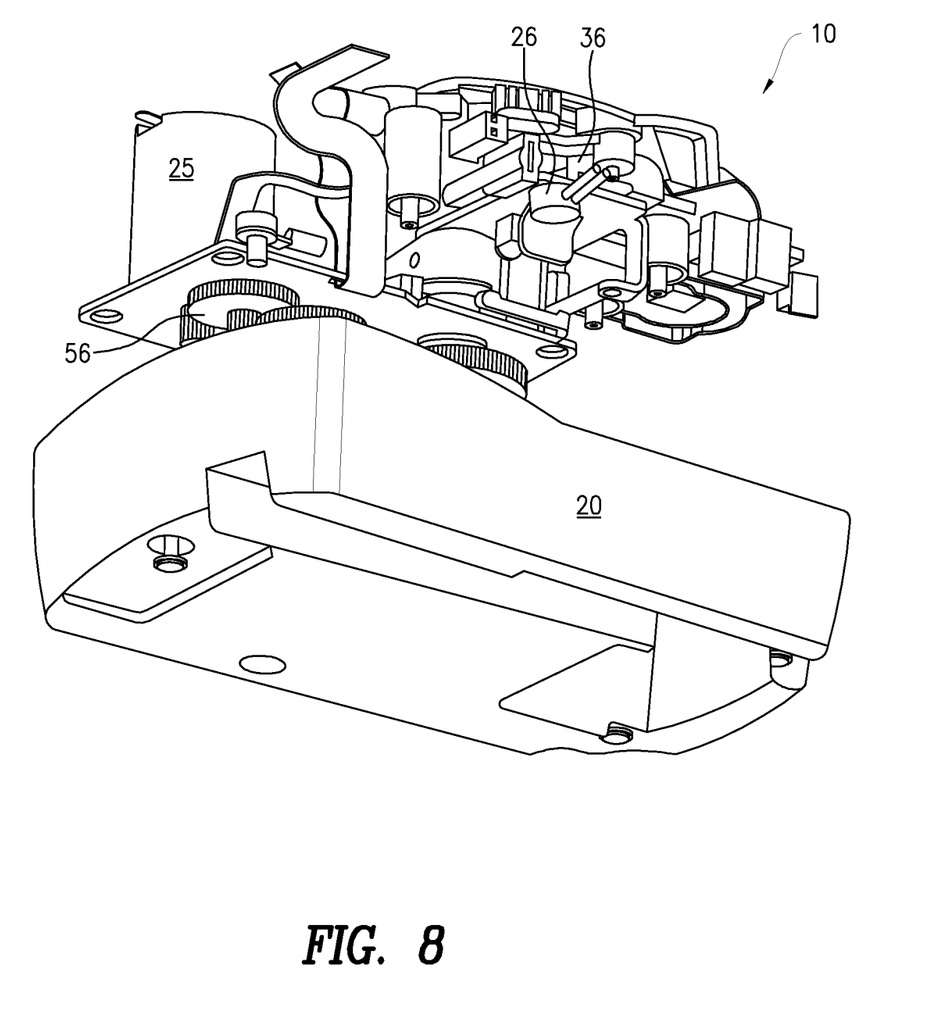
FIG. 8 is a block diagram of a lower perspective view of the exemplary EAS system tag detacher of FIG. 6 with the lower part of the housing removed, constructed in accordance with the principles of the present invention.

A lower perspective view of the exemplary EAS system tag detacher 10 of FIG. 6 is described with reference to FIG. 8. A bottom portion of detacher housing 20 is shown (a top portion of detacher housing 20 is not shown). FIG. 8 shows motor 25, which rotates gears 56 in order to move detaching element 24. Gears 56 push detaching element 24 into the arcuate channel of EAS tag 12 to unlock EAS tag 12. Haptic feedback element 26 is positioned on lower part 36 of nest 32. Specifically haptic feedback element 26 mounted to structural support of lower part 36. Lower part 36 may be a location where haptic feedback element 26 may be positioned to provide sufficient tactile feedback. An exemplary haptic feedback element 26 is described with reference to FIG. 9. In this exemplary embodiment, haptic feedback element 26 is an ERM vibration motor having leads 60 which connect haptic feedback element to circuit board 54. The ERM vibrator motor may be powered by a 3-5 volt electrical signal.

Figure 10:
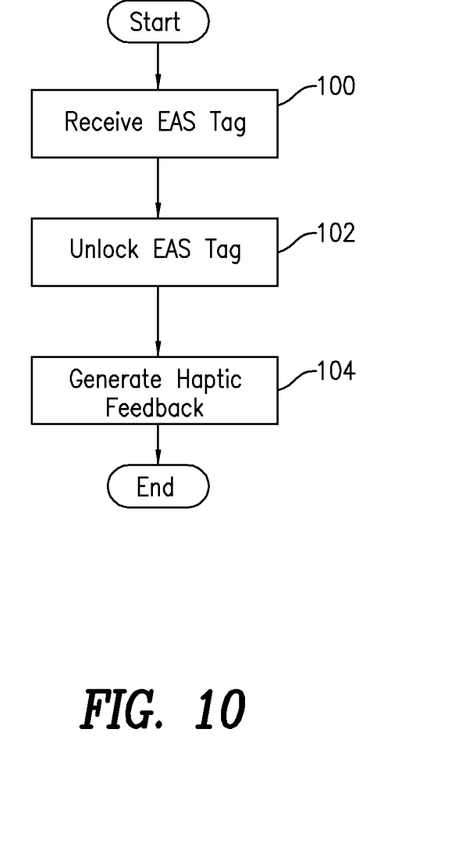
FIG. 10 is a flow chart of an exemplary process for unlocking an EAS tag, in accordance with the principles of the present invention.

An exemplary process for unlocking EAS tag 12 is described with reference to FIG. 10. The EAS tag is received by EAS tag receiving area 22 (Block 100). The EAS has locking mechanism 18 positioned in the lock position. Detaching element 24 unlocks EAS tag 12 when EAS tag 12 is received by EAS tag receiving area 22 (Block 102). Haptic feedback element 26 generates haptic feedback when EAS tag 12 has been unlocked by detaching element 24 (Block 104). The intentional added haptic feedback provided by haptic feedback element 26 provides tactile feedback to user 30. This will add as feedback the feeling of touch for user 30, reducing the likelihood of detachment error.

Figure 11:
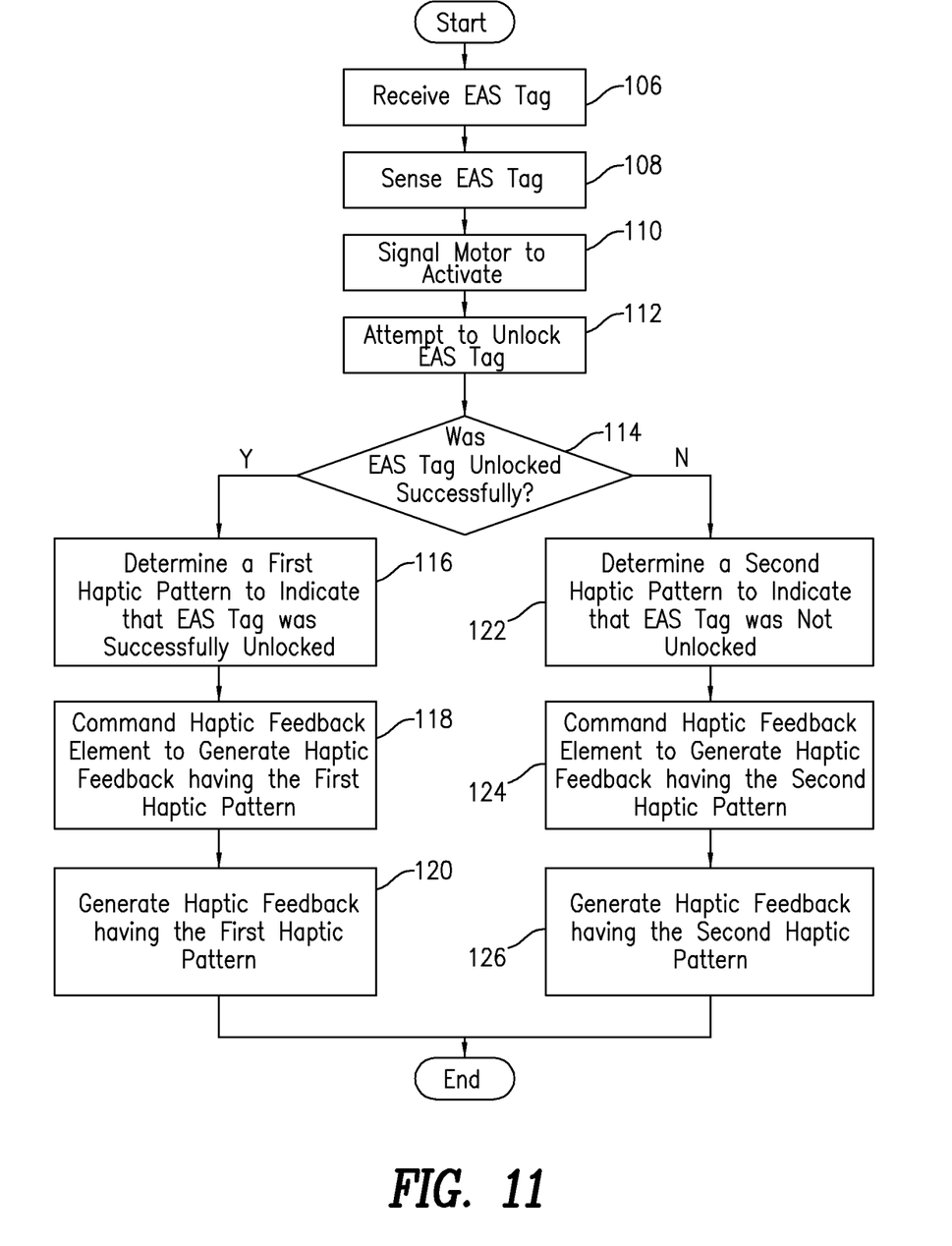
FIG. 11 is a flow chart of another exemplary process for unlocking an EAS tag, in accordance with the principles of the present invention.

Another exemplary process for unlocking EAS tag 12 is described with reference to FIG. 11. EAS tag is received by EAS tag receiving area 22 (Block 106). A switch sensor senses that EAS tag 12 has been positioned in EAS tag receiving area 22 (Block 108). Switch sensor signals motor 25 to activate (Block 110). Motor 25 engages and drives detaching element 24 to unlock EAS tag 12 (Block 112). Detaching element 24 is inserted into an arcuate channel of EAS tag 12. A determination is made as to whether EAS tag 12 was unlocked successfully by detaching element 24 (Block 114). The determination may be made by processor 40. Processor 40 also determines a haptic feedback pattern based at least in part on the detaching element 24 event, i.e., whether the detaching element 24 unlocked or not EAS tag 12.

If it is determined that EAS tag 12 was unlocked successfully, then a first haptic pattern may be determined. Processor 40 may determine the first haptic pattern to indicate that EAS tag was successfully unlocked (Block 116). Processor 40 causes haptic feedback element 26 to be driven to generate haptic feedback having the first haptic pattern (Block 118). Haptic feedback element 26 is configured to generate haptic feedback when driven, i.e., energized. Processor 40 signals haptic feedback element 26 to energize. Haptic feedback element 26 energizes and generates haptic feedback having the first haptic pattern when the EAS tag 12 has been unlocked by detaching element 24 (Block 120). User 30 feels the haptic feedback having the first haptic pattern and can safely to remove pin 16 from housing 14.

Else, if it is determined that EAS tag 12 was not unlocked, then a second haptic pattern may be determined. Processor 40 may determine the second haptic pattern to indicate that EAS tag was not successfully unlocked (Block 122). Processor 40 causes haptic feedback element 26 to be driven to generate haptic feedback having the second haptic pattern (Block 124) and haptic feedback element 26 generates haptic feedback having the second haptic pattern (Block 126). EAS tag 12 may have not been unlocked because, for example, EAS tag 12 may have not been positioned correctly on EAS tag receiving area 22. IN such case, user 30 proceeds to reposition EAS tag 12 on EAS tag receiving area 22 to attempt to unlock EAS tag 12.

Various software embodiments are described in terms of this exemplary computer system. It is understood that computer systems and/or computer architectures other than those specifically described herein can be used to implement the invention. It is also understood that the capacities and quantities of the components of the architecture described above may vary depending on the device, the quantity of devices to be supported, as well as the intended interaction with the device.

Computer program or application in the present context means any expression, in any language or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. An electronic article surveillance ("EAS") system tag detacher for unlocking an EAS tag, the EAS tag including a housing and a locking mechanism disposed within the housing, the EAS system tag detacher comprising:
    an EAS tag receiving area configured to receive the EAS tag;
    a detaching element, the detaching element configured to unlock the EAS tag; and
    a haptic feedback element, the haptic feedback element configured to generate haptic feedback when energized, the haptic feedback element being energized if the EAS tag has been unlocked by the detaching element.

2. The EAS system tag detacher of claim 1, wherein the haptic feedback element is a vibrating element, and wherein the haptic feedback generated by the haptic feedback element is a vibration.

3. The EAS system tag detacher of claim 1, wherein when the EAS tag is unlocked by the detaching element, the haptic feedback element is further configured to be energized for approximately 0.5 seconds.

4. The EAS system tag detacher of claim 1, further comprising a nest, and wherein the nest includes the EAS tag receiving area, and wherein the haptic feedback element is affixed to the nest.

5. The EAS system tag detacher of claim 4, wherein the haptic feedback generated by the haptic feedback element causes the nest to vibrate.

6. The EAS system tag detacher of claim 4, wherein the nest includes an upper part and a lower part, and wherein the haptic feedback element is affixed to the lower part of the nest.

7. The EAS system tag detacher of claim 1, wherein the EAS tag includes a pin attached to the housing, and wherein the detaching element is further configured to unlock the EAS tag using a magnetic field, and wherein the magnetic field moves the locking mechanism from the lock position to an unlock position causing the pin to detach from the housing.

8. The EAS system tag detacher of claim 1, wherein the EAS system further comprises:
    a receiver, the receiver configured to receive from a security system computer an authorization to unlock the EAS tag; and
    a processor in communication with the receiver, the processor configured to signal the detaching element to unlock the EAS tag in response to the receiver receiving the authorization.

9. The EAS system tag detacher of claim 1, wherein the EAS system further includes a processor, the processor configured to:
    determine a haptic feedback pattern based at least in part on a detaching element event; and
    instruct the haptic feedback element to generate the haptic feedback, wherein the haptic feedback has the determined haptic feedback pattern.

10. The EAS system tag detacher of claim 9, wherein the detaching element event is one of the detaching element unlocking the EAS tag and the detaching element not unlocking the EAS tag; and wherein when the detaching element unlocks the EAS tag, the determined haptic feedback pattern is a first pattern, and when the detaching element does not unlock the EAS tag, the determined haptic feedback pattern is a second pattern.

11. A method for detaching an electronic article surveillance ("EAS") tag using an EAS system tag detacher, the EAS tag including a housing and a locking mechanism disposed within the housing, the method comprising:
    receiving the EAS tag at an EAS tag receiving area of the EAS system tag detacher;
    unlocking, by a detaching element of the EAS system tag detacher, the EAS tag when the EAS tag is received by the EAS tag receiving area; and
    generating haptic feedback using a haptic feedback element of the EAS system tag detacher if the EAS tag has been unlocked by the detaching element.

12. The method of claim 11, wherein the haptic feedback element is a vibrating element, and wherein generating the haptic feedback includes generating a vibration.

13. The method of claim 11, wherein the haptic feedback generated has a duration of approximately 0.5 seconds.

14. The method of claim 11, wherein a nest of the EAS system tag detacher includes the EAS tag receiving area, and wherein receiving the EAS tag includes receiving the EAS tag in the nest, the method further comprising:
    affixing the haptic feedback element to the nest.

15. The method of claim 14, wherein the nest includes a higher part and a lower part, and wherein the haptic feedback generated causes the lower part of the nest to vibrate.

16. The method of claim 11, wherein the EAS tag includes a pin attached to the housing, and wherein unlocking the EAS tag further comprises:
    creating a magnetic field; and
    unlocking the EAS tag using the magnetic field, wherein the magnetic field moves the locking mechanism from the lock position to an unlock position causing the pin to detach from the housing.

17. The method of claim 11, further comprising:
    receiving from a security system computer an authorization to unlock the EAS tag; and
    signaling the detaching element to unlock the EAS tag in response to receiving the authorization.

18. The method of claim 11, further comprising:
    determining a haptic feedback pattern based at least in part on a detaching element event; and
    instructing the haptic feedback element to generate the haptic feedback having the determined haptic feedback pattern.

19. The method of claim 18, further comprising:
  determining whether the EAS tag has been unlocked;
  if it is determined that the EAS tag has been unlocked, then determining that the detaching element event is a first detaching element event;
  else, if the EAS tag has not been unlocked, then determining that the detaching element event is a second detaching element event; and
wherein determining the haptic feedback pattern further comprises:
  if the detaching element event is the first detaching element event, then determining that the haptic feedback pattern is of a first type;
  else, if the detaching element event is the second detaching element event, then determining that the haptic feedback pattern is of a second type.

20. An electronic article surveillance ("EAS") system tag detacher for unlocking an EAS tag, the EAS tag including a housing and a locking mechanism disposed within the housing, the EAS system tag detacher comprising:
  an EAS tag receiving area configured to receive the EAS tag;
  a detaching element including a hook, the detaching element configured to unlock the EAS tag by inserting the hook into the housing;
  a processor, the processor configured to determine whether the EAS tag has been unlocked by the detaching element; and
  a haptic feedback element affixed to a lower part of the EAS tag receiving area, the haptic feedback element configured to generate haptic feedback when the processor determines that the EAS tag has been unlocked by the detaching element.

* * * * *